United States Patent
Casebolt et al.

(10) Patent No.: US 10,728,821 B2
(45) Date of Patent: *Jul. 28, 2020

(54) MIGRATING WIRELESS CHANNELS USING DUAL MEDIA ACCESS CONTROLLERS

(71) Applicant: Microsoft Technology Licensing, LLC, Redmond, WA (US)

(72) Inventors: Mark W. Casebolt, Seattle, WA (US); Naveen Makineni, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,374

(22) Filed: Feb. 19, 2019

(65) Prior Publication Data

US 2019/0182738 A1    Jun. 13, 2019

Related U.S. Application Data

(63) Continuation of application No. 14/809,619, filed on Jul. 27, 2015, now Pat. No. 10,257,758.

(51) Int. Cl.
*H04W 36/18* (2009.01)
*H04W 36/06* (2009.01)
(Continued)

(52) U.S. Cl.
CPC .......... *H04W 36/18* (2013.01); *H04W 36/06* (2013.01); *H04W 36/36* (2013.01); *H04W 36/28* (2013.01)

(58) Field of Classification Search
CPC ..... H04W 16/14; H04W 24/02; H04W 84/12; G01S 7/021
See application file for complete search history.

(56) References Cited

U.S. PATENT DOCUMENTS 10,257,758 B2 * 4/2019 Casebolt ............... H04W 36/06

FOREIGN PATENT DOCUMENTS

CN    101390429 A    3/2009
CN    101470192 A    7/2009
(Continued)

OTHER PUBLICATIONS

"First Office Action and Search Report Issued in Chinese Patent Application No. 201680044371.7", dated Apr. 14, 2020, 25 Pages.

*Primary Examiner* — Marsha D Banks Harold
*Assistant Examiner* — Elton Williams
(74) *Attorney, Agent, or Firm* — Ray Quinney & Nebeker P.C; James Bullough

(57) ABSTRACT

The claimed subject matter includes techniques for migrating wireless channels. An example method includes initiating, via a first media access controller on an integrated circuit chip, a first connection on a first wireless channel. The example method also includes performing, via a second media access controller on the integrated circuit chip, a scan on additional wireless channels using a second media access controller. The example method also includes detecting, via the second media access controller, an available wireless channel from the additional wireless channels. The method further includes migrating, via the first media access controller, the first connection from the first wireless channel to the available wireless channel. The method further includes combining the second access media controller with the first media access controller to provide increased throughput or signal quality on the available wireless channel.

20 Claims, 4 Drawing Sheets

(51) Int. Cl.
*H04W 36/36* (2009.01)
*H04W 36/28* (2009.01)

(56) References Cited

FOREIGN PATENT DOCUMENTS

| | | |
|---|---|---|
| CN | 101902768 A | 12/2010 |
| CN | 102571169 A | 7/2012 |
| CN | 103987048 A | 8/2014 |
| CN | 105264919 A | 1/2016 |

\* cited by examiner

100

MIGRATING WIRELESS CHANNELS USING DUAL MEDIA ACCESS CONTROLLERS

CROSS-REFERENCE TO RELATED APPLICATIONS

This application is a continuation of U.S. patent application Ser. No. 14/809,619, filed Jul. 27, 2015, and entitled "MIGRATING WIRELESS CHANNELS USING DUAL MEDIA ACCESS CONTROLLERS", the application of which is incorporated herein in its entirety by reference.

BACKGROUND

Wireless devices may communicate using wireless channels and thus share one or more bands of the wireless spectrum. For example, access points may use different wireless channels of a particular band in order to prevent interference caused by using the same channel.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

Another implementation provides for a system for migrating wireless channels. The system includes a single integrated circuit chip including a first media controller and a second media controller. The first media access controller may be configured to initiate a first connection on a first wireless channel. The second media controller may be configured to perform a scan on additional wireless channels. The second media controller may be configured to detect an available wireless channel from the additional wireless channels. The second media controller may be configured to send an indicator corresponding to the available wireless channel to the first media controller, the first media controller to send the indication to a client device and migrate the first connection from the first wireless channel to the available wireless channel. The second media controller may also be configured to combine with the first media access controller to provide increased throughput or improved wireless signal reception on the available wireless channel.

Another implementation provides method for migrating between wireless channels. The method can include initiating, via a first media access controller on an integrated circuit chip, a first connection on a first wireless channel. The method can also include performing, via a second media access controller on the integrated circuit chip, a scan on additional wireless channels using a second media access controller. The method can further include detecting, via the second media access controller, an available wireless channel from the additional wireless channels. The method can also further include migrating, via the first media access controller, the first connection from the first wireless channel to the available wireless channel. The method can also include combining the second access media controller with the first media access controller to provide increased throughput or signal quality on the available wireless channel.

Another implementation provides for one or more computer-readable memory storage devices for storing computer readable instructions that, when executed by one or more processing devices, instruct the migration of wireless channels. The computer-readable instructions can include code to receive an energy profile. The computer-readable instructions can also include code to detect an energy profile of a priority device. The computer-readable instructions can include code to send an indication to a first media access controller on an integrated circuit chip. The first media access controller can switch to a different wireless channel upon receiving the indication. The integrated circuit chip can further include a second media access controller to concurrently scan for additional wireless channels and combine with the first media access controller when not scanning for additional wireless channels.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
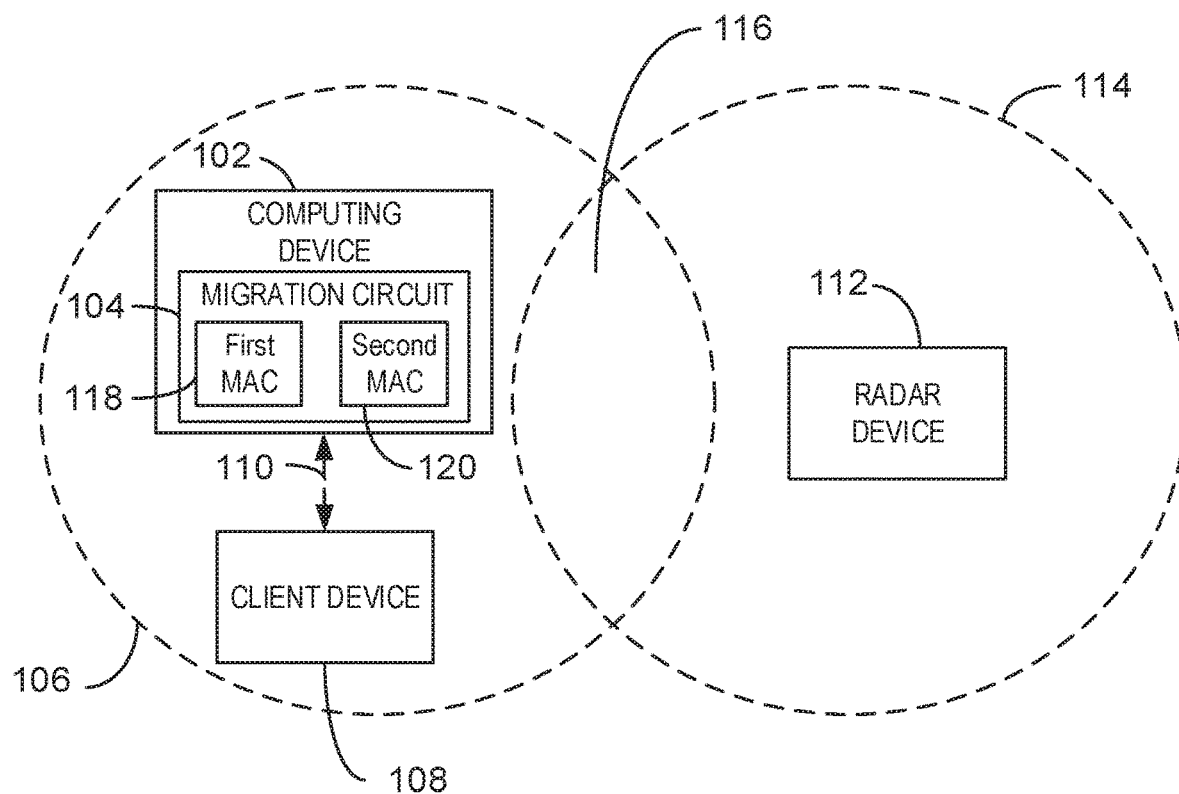
FIG. 1 is a block diagram of an example operating environment configured for implementing various aspects of the techniques described herein.

Wireless communications are subject to noise from a variety of interference sources, especially in the crowded ISM (Instrumentation, Scientific, and Medical) bands commonly used for local wireless networks. Such interference can degrade user experience. In human interface devices, where latency and responsiveness are commonly expected to operate in the single digit millisecond range, interference adds uncertainty and degrades the human interface experience. For example, in gaming consoles and PC-based gaming configurations that have low latency, connected human interface devices such as controllers may become unusable due to effects of interference on latency.

One solution is to operate these human interface wireless connections in a frequency band that has few, if any, interference sources. For example, some bands of the wireless spectrum are used infrequently and thus commonly available. Recognizing that some frequency band allocations for radar and other military usage are rarely occupied across the broader population, the Federal Communications Commission (FCC) and international regulatory bodies have initiated the concept of fair usage or "Dynamic Frequency Allocation". The process of entering these channels is known as "Dynamic Frequency Selection" (DFS). The frequency bands involved are commonly known as DFS channels.

In some examples, communications can be lost during a Channel Availability Check (CAC) cycle entry. The CAC process is a clearance process for using DFS that can take anywhere from 60 seconds to several minutes to determine if each channel is available and can be used. During the CAC period, the access point is unavailable to respond to client device requests. Once the access point determines that the DFS channel is clear of radar, the access point can then occupy that channel After DFS operation is initiated, approved DFS client devices may then operate with the access point (AP) in this band of a DFS channel. However, there are certain classes of wireless devices that cannot allow long disruptions in client service. For example, human interface devices are expected to operate in the single digit millisecond range with respect to latency.

In addition, some wireless mobile and consumer electronics may have multiple antennas connected to single transmission (Tx) and multiple reception (Rx) chains. A chain, as used herein, and also known as a radio chain, refers to a transceiver, an associated antenna, and any other hardware and/or software used to process a signal. A single Tx chain can save power and in some examples may use a preferred antenna based on channel metrics. Using multiple Rx chains may result in marginally increased power and cost of hardware design, but can provide benefits of spatial Rx diversity. For example, spatial Rx diversity can employ multiple antennas and/or Rx chains to increase quality and/or improve reliability of the wireless link.

This disclosure describes techniques to migrate between wireless channels. As used herein, migration refers to movement from one wireless channel to another wireless channel while maintaining a wireless data transmission. In particular, a dual band integrated circuit can be used to migrate between wireless channels. In some examples, the dual band integrated circuit can also be used to maintain a connection in the face of multipath effects such as fading, which can degrade wireless connections substantially. A first media access controller (MAC) of the dual band integrated circuit may be configured to initiate a first connection on a first wireless channel A second MAC, or portions of the second MAC, may be configured to perform a scan on additional wireless channels, detect an available wireless channel from the additional wireless channels, and send the available wireless channel to the first MAC. Unlike typical wireless communications, a radar signature scan may involve an energy evaluation. An energy evaluation includes the detection of a series of in-channel energy bursts with deterministic timing periodicity. The first MAC may be further configured to then migrate the first connection from the first wireless channel to the available wireless channel. In some examples, the first MAC may also be configured to monitor the migrated wireless channel, detect a conflicting use of the migrated wireless channel, and migrate the migrated wireless channel to a third wireless channel based on the detected conflicting use. For example, the first MAC may revert to using a channel from the wireless local area network protocol signal frequency band if a DFS channel is in use by a device with higher priority such as radar.

When not performing a DFS scan, the second MAC may operate together or combine with the first MAC to achieve Rx diversity. For example, the first and second MACs can be used to achieve Rx diversity using a combining technique. A combining Rx diversity architecture can employ a plurality of MACs that are tuned to decode the same data stream, thus providing the data throughput ability of a single in single out (SISO) (i.e. a 1×1) system. For example, in combining, all antennas may maintain established connections at all times. The signals can then be combined and presented to the receiver. Using maximal-ratio combining, the signals can be weighted and added coherently. A maximal-ratio combining system provides the greatest resistance to fading but since all the receive paths remain energized, however maximal-ratio combining also consumes more power. As used herein, fading refers to deviation of the attenuation affecting a signal over certain propagation media. In some examples, the second MAC may also be used to support or continue to support radio link margin in the face of cancellation effects such as fading via such techniques such as Fast Diversity selection. As used herein, Fast Diversity selection refers to the detection, decoding, and evaluation, on each receive chain, the single transmit signal, and the combination of weighted signal combined from each receive chain, to achieve the best signal estimate in the presence of noise. In addition, although Rx diversity capability may be lost during the time that the second MAC is performing the DFS scan as described above, the overall effects of the scan can be mitigated by performing the DFS scan efficiently. For example, during a DFS scan interval, typically there would be no active data content. If a diversity element is unavailable to do the scan, the active connection may be selected by picking the best channel signal characteristics from each of the available channels which are evaluated during the decoding process for active packets. Since radar signatures can come from any direction, the remaining channel(s) may be used to do the DFS scan.

The techniques thus enable maintenance of uninterrupted data transmission between two wireless devices, while meeting regulatory detection requirements on DFS channels. For example, the techniques allow wireless devices to avoid the inhibitive "dead space" incurred with the current interpretation of DFS CAC entry as discussed in greater detailed with respect to FIG. 1 below. In addition, the techniques herein enable more efficient wireless channel migration by scanning additional wireless channels and detecting available channels via a single integrated circuit and taking advantage of potentially redundant Rx chains and/or Rx MACs. Moreover, the techniques improve the detectability of radar signatures during a CAC scan while having a minimal impact on data throughput as the second MAC can be combined with the first MAC when not performing the DFS scan. Finally, the techniques can be implemented independently of other clients in the same subnet. The techniques do not use control signaling with any remote node to perform the DFS scan. These techniques are described in more detail herein.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 7, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media include magnetic storage devices, e.g., hard disk, floppy disk, magnetic strips, optical disk, compact disk (CD), digital versatile disk (DVD), smart cards, flash memory devices, among others. Moreover, computer-readable storage media does not include communication media such as transmission media for wireless signals. In contrast, computer-readable media, i.e., not storage media, may include communication media such as transmission media for wireless signals.

FIG. 1 is a block diagram of an example operating environment configured for implementing various aspects of the techniques described herein. The example system of FIG. 1 is referred to generally by the reference number 100.

The example system 100 includes a computing device 102 having a migration circuit 104 and an associated wireless connection range 106. The computing device 102 is wirelessly coupled to a client device 108 via wireless connection 110. The system 100 further includes a radar device 112 with an associated wireless connection range 114. The wireless connection range 106 and the wireless connection range 114 overlap to form an area of wireless interference 116. The migration circuit 104 also further includes a first media access controller (MAC) 118 and a second MAC 120.

In the example system 100, the computing device 102 can be any computing device that is able to couple wirelessly to another client device 108. The client device 108 can be an input device or an output device. For example, the client device 108 can be a human interface device such as a remote controller, mouse, keyboard, among other devices.

As shown in FIG. 1, the computing device 102 includes a migration circuit 104. For example, the migration circuit 104 can be a Dual Band Dual Concurrent (DBDC) 802.11 class monolithic Integrated Circuit (IC). The migration circuit 104 may include a 2×2 radio configured to operate as two separate 1×1 radios and media access controllers. A 1×1 radio as used herein, refers to a radio streaming one media stream and having one antenna. A 1×1 radio can transmit and receive one communication chain or one communication stream. For example, a 1×1 radio may include a single stream radio which has combined the received signal from two or more diverse signal paths to offset the effects of multipath cancellation. The radio may operate by transmitting on a single antenna, or by transmitting a single stream on multiple antennas concurrently. Such a 1×1 may be operated beneficially without the implementation of MIMO or 2×2 signal processing. A 2×2 radio, as used herein, refers to a radio capable of streaming two media streams and having two antennae. In some example, a 2×2 radio can also split one stream. Normally, operational limitations for conventional communications would inhibit independent communications channels with a single radio IC due to signal-to-noise ratio (SNR) issues. For example, operating channels between dual band dual channel (DBDC) radio channels are typically limited to disparate frequency bands to prevent signal and noise contamination. However, because a CAC scan is a receive-only process, the frequency synthesizers of the radio may select similar channels without penalty provided that DFS energy profile detection module (not shown) in the computing device is similarly enabled. The DFS energy profile detection module can detect energy profiles for various wireless devices. An energy profile, as used herein, refers to a file containing a plurality of profiles used to identify different types of wireless services. The energy profile detection module is described at greater length with respect to FIGS. 3 and 4 below.

In some examples, both MAC channels can be used for fast diversity detection as a 1×1 radio. For example, fast diversity refers to selecting an input signal based on a received signal to noise as detected on a packet by packet basis. In some examples, the results may be combined at every packet for the best signal to noise performance. Slow diversity, as used herein, refers to selection of one antenna versus another as a 1×1 and sticking with that for some predetermined period of time, such as 100-200 milliseconds. As fading characteristics change rapidly, slow diversity is not very effective in a dynamic fading environment. For example, fading characteristics may change every 10 milliseconds. In the present techniques, no element of the 2×2 may be used, thus no signal processing in a traditional MIMO sense may occur. The ability to maintain communications during fading can be maintained, while the DFS detection capabilities on an alternate channel may still be implemented. When attempting to enter a DFS band, typically when wireless activity is quiescent, client devices are serviced by a first single 1×1 radio, also referred to herein as a first MAC 118. The first MAC 118 may select a channel based on best connectivity. A second MAC 120 can meanwhile be set to monitor a particular frequency corresponding to the prospective DFS channel for a CAC interval scan. Once the scan is fulfilled, the second MAC 120 may resume normal operation. For example, the second MAC 120 may operate as a 1×1 radio, N×N multiple input, multiple output (MIMO) connection, or a maximum ratio combining (MRC) diversity connection in combination with the first MAC 118 for best throughput and/or wireless signal quality. As used herein, MIMO refers to method for multiplying the capacity of a radio link using multiple transmit and receive antennas to exploit multipath propagation. Maximum ratio combining refers to a spatial diversity strategy to reduce the signal fluctuations caused by multipath propagation in wireless communications. For example, the input signal from one channel can be scaled and directly combined with the weighted input from another channel(s). Maximum ratio combining can be done in quadrature space so the composite input signal provides the best estimate of having been adjusted for the incoming signal. In any case, once the second MAC 120 has finished the CAC interval scan, the first MAC 118 may enter the DFS channel along with its clients 108 for a reduced noise operating experience. For example, the CAC interval can be a predetermined amount of time such as may be set by wireless regulations. In some examples, the second MAC 120 may combine with the first MAC 120 for increased throughput and/or signal quality on the DFS channel.

Still referring to FIG. 1, if the CAC process clears the prospective DFS channel for the presence of energy profiles such as radar, the first MAC 118 can occupy the DFS channel and begin an in-service monitoring process for the computing device 102. During in-service monitoring, the first MAC 118 can transmit beacons at predetermined periods of time on the DFS channel and switch to receiver mode to listen for connection requests from client devices 108 to detect radar 104 or any other suitable interference on the DFS channel Thus, the computing device 102 is still able to monitor for radar when the computing device 102 is in receiver mode. If the host device 102 detects radar during the in-service monitoring, the computing device 102 can communicate via wireless connection 110 to the client device(s) 108 to vacate the DFS channel and move to a non-DFS channel. For example, the first MAC 118 on the host device 102 can communicate the client devices 108 to temporarily move to a wireless local area network protocol channel. The second MAC 120 can then find an alternate available DFS channel and begin the CAC process such that the first MAC 118 can occupy the alternate available DFS channel once the CAC process is again completed.

Thus, the present techniques manage one spatial stream with two or more antennas. The techniques making use of the front ends of two separate receive chains in a non-MIMO configuration, while gaining beneficial protection from cancellation or multi-path effects. Maintaining independent communications channels within a single radio IC provides flexibility to operate as two separate 1×1 radios via a 2×2 radio. In addition, manufacturing a 2×2 radio on a single silicon chip may be more efficient than manufacturing two separate 1×1 radios.

The diagram of FIG. 1 is not intended to indicate that the example system 100 is to include all of the components shown in FIG. 1. Rather, the example system 100 can include fewer or additional components not illustrated in FIG. 1 (e.g., additional clients, external devices, MACs, etc.). For example, although a radar device 112 is used for illustration, the radar device 112 can be any wireless device having an energy profile that can be detected. Moreover, the techniques can be scaled to include MIMO and MISO systems, but at the expense of increased latency and a risk of wireless link loss.

Figure 2:
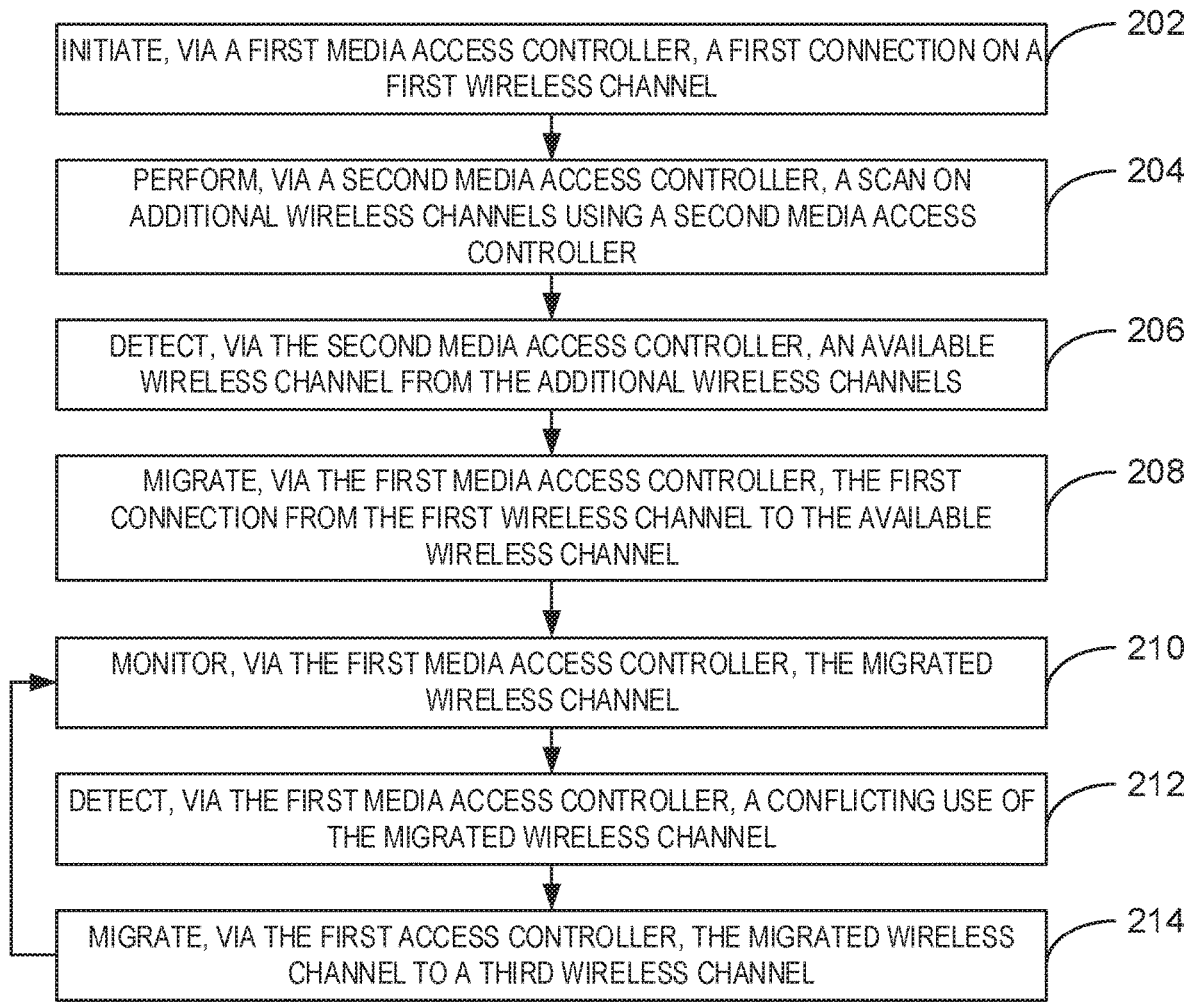
FIG. 2 shows a process flow diagram of an example method for migrating between wireless channels.

FIG. 2 shows a process flow diagram of an example method for migrating between wireless channels. The example method is generally referred to by the reference number 200 and can be implemented using computer 302 as described below. The example method 200 can be performed by the example system 100.

At block 202, a first media access controller initiates a first connection on a first wireless channel. For example, the first wireless channel can be any suitable frequency band that can transmit data using a wireless local area network protocol. In some embodiments, the first media access controller can initiate a first connection with a client device via a wireless channel using any suitable configuration or handshake that complies with a wireless local area network protocol.

At block 204, a second media access controller performs a scan of additional wireless channels using a second media access controller. For example, the additional wireless channels can be DFS channels that are available for use. In some examples, the additional wireless channels can be wireless local area network protocol channels that may be available for use. For example, one or more wireless local area network protocol channels may be available in a particular area at a particular time.

At block 206, the second media access controller detects an available wireless channel from the additional wireless channels. For example, the available wireless channel may be a DFS channel. In some examples, the second media access controller may perform a channel availability check (CAC) on the available wireless channel for a predetermined amount of time before migrating to the available wireless channel via the first media access controller. The second media access control can detect the available wireless channel and perform the channel availability check while the first media access controller maintains a connection with client devices over the first wireless channel. In some examples, when not performing the channel availability check, the second media access controller can operate individually as a 1×1 radio, or together with one or more other media access controllers in an N×N multiple input, multiple output (MIMO), or a maximal-ratio combining (MRC) diversity connection after performing a detection and clearance of a DFS channel. For example, the second media access controller can operate in conjunction with the first media access controller to provide a combined connection with greater throughput or multiple connections with less latency.

At block 208, the first media access controller migrates the first connection from the first wireless channel to the available wireless channel. For example, the first media access controller may send an indication to one or more client devices to use the available wireless channel and then switch over to using the available wireless channel. In some examples, the second media access controller may combine with the first media access controller to provide enhanced throughput to the one or more client devices using the available wireless channel.

At block 210, the second media access controller combines with the first media access controller to provide increased throughput or signal quality on the available wireless channel. For example, using combining, the first and second media access controllers can be tuned to decode the same data stream, thus providing the data throughput ability of a single in single out (SISO) (i.e. a 1×1) system. In some examples, maximal-ratio combining can be used to weight and add signals received by different antennas coherently. In some examples, the second media access controller may operate as a 1×1 single input, single output (SISO), an N×N multiple input, multiple output (MIMO), or a maximal-ratio combining (MRC) diversity connection with the first media access controller when not performing a DFS scan.

At block 212, the first media access controller monitors the migrated wireless channel. For example, the first media access controller may perform in-service monitoring for energy profiles. In some examples, the second media controller may scan additional wireless channels to detect channels with lower signal-to-noise ratios (SNR) as in block 204.

At block 214, the first media access controller detects a conflicting use of the migrated wireless channel. For example, the first media access controller may detect a radar energy profile. In some examples, the conflicting use can be a device that has priority access to the migrated wireless channel. For example, a radar device, among other commercial and/or military devices, may have priority over DFS channels.

At block 216, the first media access controller migrates the migrated wireless channel to a third wireless channel. For example, the third wireless channel may be a wireless local area network protocol channel. In some examples, the first media access controller may temporarily migrate the wireless channel to a wireless local area network protocol channel until the second media access controller detects and clears an alternate DFS channel. As shown by an arrow in FIG. 2, the first media access controller may then monitor the migrated wireless channel again for energy profiles. In some examples, the second media controller may also again scan additional wireless channels to detect channels with lower signal-to-noise ratios (SNR) as in block 204.

This process flow diagram is not intended to indicate that the blocks of the method 200 are to be executed in any particular order, or that all of the blocks are to be included in every case. Further, any number of additional blocks not shown may be included within the method 200, depending on the details of the specific implementation.

Figure 3:
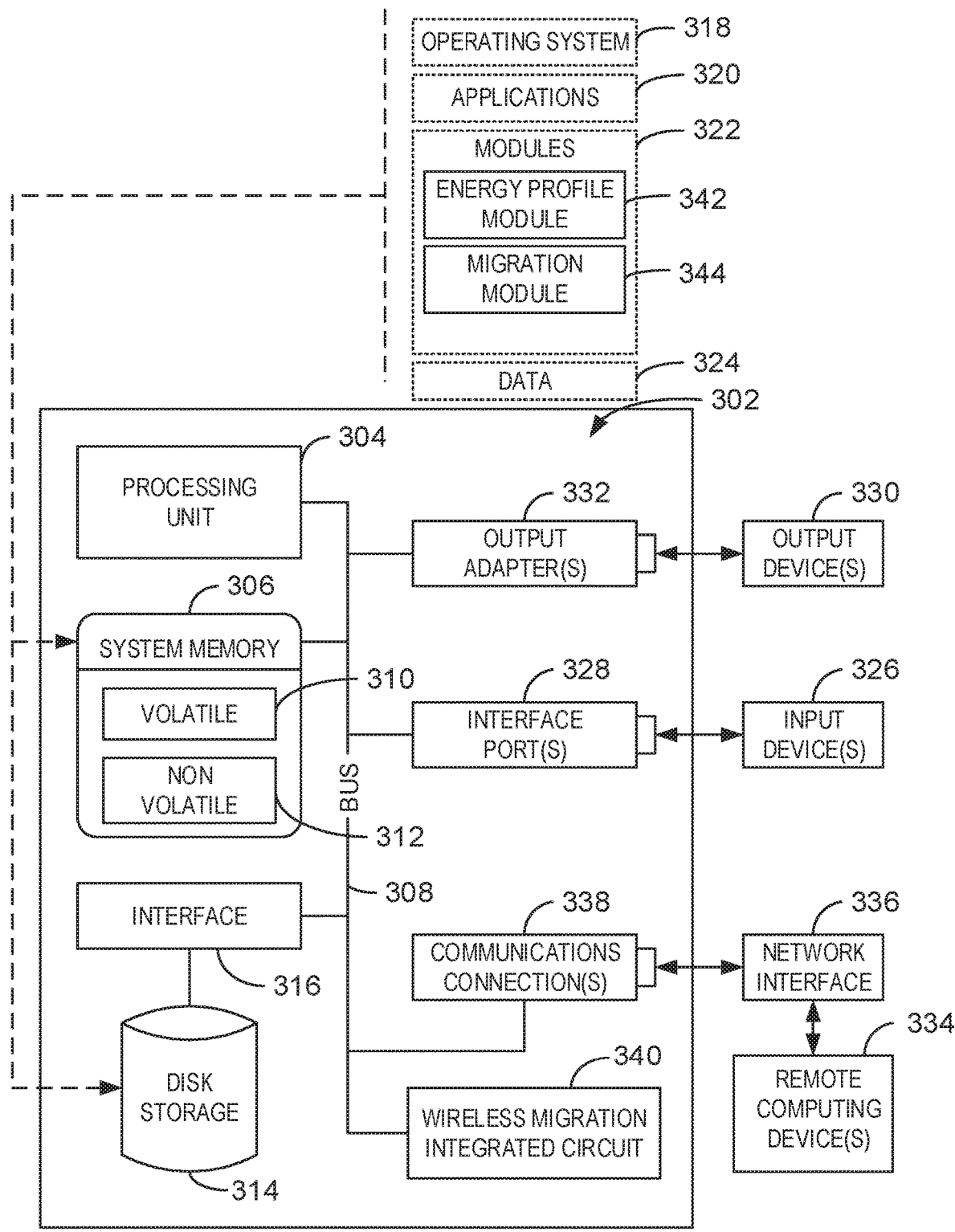
FIG. 3 is a block diagram of an example system for migrating between wireless channels.

FIG. 3 is a block diagram of an example system for migrating between wireless channels. The example operating environment 300 includes a computer 302. The computer 302 includes a processing unit 304, a system memory 306, and a system bus 308. For example, the computer 302 may be a gaming console.

The system bus 308 couples system components including, but not limited to, the system memory 306 to the processing unit 304. The processing unit 304 can be any of various available processors. Dual microprocessors and other multiprocessor architectures also can be employed as the processing unit 304.

The system bus 308 can be any of several types of bus structure, including the memory bus or memory controller, a peripheral bus or external bus, and a local bus using any variety of available bus architectures known to those of ordinary skill in the art. The system memory 306 includes computer-readable storage media that includes volatile memory 310 and nonvolatile memory 312.

The basic input/output system (BIOS), containing the basic routines to transfer information between elements within the computer 302, such as during start-up, is stored in nonvolatile memory 312. By way of illustration, and not limitation, nonvolatile memory 312 can include read-only memory (ROM), programmable ROM (PROM), electrically programmable ROM (EPROM), electrically erasable programmable ROM (EEPROM), or flash memory.

Volatile memory 310 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 302 also includes other computer-readable media, such as removable/non-removable, volatile/non-volatile computer storage media. FIG. 3 shows, for example a disk storage 314. Disk storage 714 includes, but is not limited to, devices like a magnetic disk drive, floppy disk drive, tape drive, Jaz drive, Zip drive, LS-210 drive, flash memory card, or memory stick.

In addition, disk storage 314 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 314 to the system bus 308, a removable or non-removable interface is typically used such as interface 316.

It is to be appreciated that FIG. 3 describes software that acts as an intermediary between users and the basic computer resources described in the suitable operating environment 300. Such software includes an operating system 318. Operating system 318, which can be stored on disk storage 314, acts to control and allocate resources of the computer 302.

System applications 320 take advantage of the management of resources by operating system 318 through program modules 322 and program data 324 stored either in system memory 306 or on disk storage 314. It is to be appreciated that the claimed subject matter can be implemented with various operating systems or combinations of operating systems.

A user enters commands or information into the computer 302 through input devices 326. Input devices 326 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. The input devices 326 connect to the processing unit 304 through the system bus 308 via interface ports 328. Interface ports 328 include, for example, a serial port, a parallel port, a game port, and a universal serial bus (USB).

Output devices 330 use some of the same type of ports as input devices 326. Thus, for example, a USB port may be used to provide input to the computer 302, and to output information from computer 302 to an output device 330.

Output adapter 332 is provided to illustrate that there are some output devices 330 like monitors, speakers, and printers, among other output devices 330, which are accessible via adapters. The output adapters 332 include, by way of illustration and not limitation, video and sound cards that provide a means of connection between the output device 330 and the system bus 308. It can be noted that other devices and systems of devices provide both input and output capabilities such as remote computers 334.

The computer 302 can be a server hosting various software applications in a networked environment using logical connections to one or more remote computers, such as remote computers 334. The remote computers 334 may be client systems configured with web browsers, PC applications, mobile phone applications, and the like. The remote computers 334 can be a personal computer, a server, a router, a network PC, a workstation, a microprocessor based appliance, a mobile phone, a peer device or other common network node and the like, and typically includes many or all of the elements described relative to the computer 302.

Remote computers 334 can be logically connected to the computer 302 through a network interface 336 and then connected via a communication connection 338, which may be wireless. Network interface 336 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 338 refers to the hardware/software employed to connect the network interface 336 to the bus 308. While communication connection 338 is shown for illustrative clarity inside computer 302, it can also be external to the computer 302. The hardware/software for connection to the network interface 336 may include, for exemplary purposes, internal and external technologies such as, mobile phone switches, modems including regular telephone grade modems, cable modems and DSL modems, ISDN adapters, and Ethernet cards.

The computer 302 can further include a wireless migration integrated circuit 340. For example, the wireless migration integrated circuit 340 can be a Dual Band Dual Concurrent (DBDC) 802.11 class monolithic Integrated Circuit (IC). The migration circuit 104 may include a 2×2 radio configured to operate as two separate 1×1 radios and media access controllers as discussed above with reference to FIG. 1.

An example processing unit 304 for the server may be a computing cluster. Additionally, the disk storage 314 can store various types of data 324 used to detect priority devices. For example, the disk storage 314 may be an enterprise data storage system, for example, storing data 324 such as energy profiles.

The computer 302 includes one or more modules 322 configured to perform migration between wireless channels, including an energy profile module 342 and a migration module 344. The energy profile module 342 can receive a plurality of energy profiles. The energy profile module 342 can also detect an energy profile of a priority device and send an indication to one or more media access controllers (MACs). For example, the indication can be used by a MAC to migrate to a wireless local area network protocol channel from a limited access channel such as a Dynamic Frequency Selection (DFS) channel. In some examples, the migration module 344 can send the indication to the MAC to begin the migration process.

It is to be understood that the block diagram of FIG. 3 is not intended to indicate that the computing system 300 is to include all of the components shown in FIG. 3. Rather, the computing system 300 can include fewer or additional components not illustrated in FIG. 3 (e.g., additional modules, additional memory devices, additional network interfaces, additional MACs, etc.). Furthermore, any of the functionalities of the energy profile module 340 can be partially, or entirely, implemented in hardware and/or in a processor. For example, the functionality can be implemented with an application specific integrated circuit, in logic implemented in the processor, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 4:
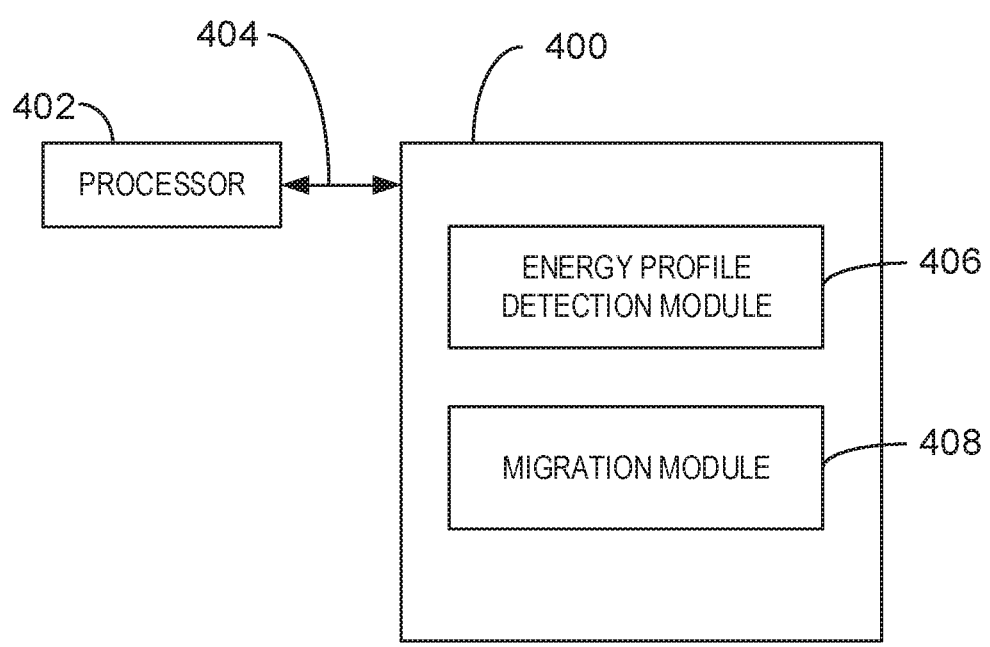
FIG. 4 is a block diagram showing an example tangible, computer-readable storage medium that can be used to migrate between wireless channels.

FIG. 4 is a block diagram showing an example tangible, computer-readable storage medium that can be used to migrate between wireless channels. The tangible, computer-readable storage media 400 can be accessed by a processor 402 over a computer bus 404. Furthermore, the tangible, computer-readable storage media 400 can include code to direct the processor 402 to perform the current methods.

The various software components discussed herein can be stored on the tangible, computer-readable storage media 400, as indicated in FIG. 4. For example, the tangible computer-readable storage media 400 can include an energy profile detection module 406 and a migration module 408. In some implementations, the energy profile detection module 406 includes code to receive a plurality of energy profiles. For example, the energy profiles can include radar profiles. In some examples, the energy profiles can include military device energy profiles. The energy profile detection module 406 can also include code to detect an energy profile of a priority device and send an indication to a media access controller. For example, the energy profile may be that of a radar or military device. The migration module 408 can cause a first media access controller to switch to a different wireless channel upon receiving the indication. For example, the migration module 408 can cause the first media access controller to switch to a wireless local area network protocol channel. The first media access controller may be one of two media access controllers on a dual channel, dual concurrent integrated circuit. The integrated circuit chip may also include a second media access controller to concurrently scan for additional wireless channels and combine with the first media access controller when not scanning for additional wireless channels.

It is to be understood that any number of additional software components not shown in FIG. 4 can be included within the tangible, computer-readable storage media 400, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLE 1

This example provides for an example system for wireless channel migration. The example system also includes a single integrated circuit chip including a first media access controller and a second media access controller. The first media access controller may initiate a first connection on a first wireless channel. The second media access controller may perform a scan on additional wireless channels. The second media access controller may also detect an available wireless channel from the additional wireless channels. The second media access controller may also further send an indicator corresponding to the available wireless channel to the first media controller, the first media controller to send the indication to a client device and migrate the first connection from the first wireless channel to the available wireless channel. The second media access controller may also combine with the first media access controller to provide increased throughput on the available wireless channel. Alternatively, or in addition the first media access controller may monitor the migrated wireless channel. Alternatively, or in addition, the first media access controller may detect a conflicting use of the migrated wireless channel. Alternatively, or in addition, the first media access controller to migrate the migrated wireless channel to a third wireless channel based on the detected conflicting use. Alternatively, or in addition, the conflicting use of the migrated wireless channel may be a radar. Alternatively, or in addition, the example system can include an energy profile module to detect an energy profile of a priority device and send an indication to the first media access controller, wherein the first and the third wireless channels are wireless local area network protocol channels and the second wireless channel is a channel of a Dynamic Frequency Selection band. Alternatively, or in addition, the second media access controller may be configured to support radio link margin against cancellation effects.

EXAMPLE 2

This example provides for an example method for migrating between wireless channels. The example method includes initiating, via a first media access controller on an integrated circuit chip, a first connection on a first wireless channel. The example method includes performing, via a second media access controller on the integrated circuit chip, a scan on additional wireless channels using a second media access controller. The example method also includes detecting, via the second media access controller, an available wireless channel from the additional wireless channels. The example method further includes migrating, via the first media access controller, the first connection from the first wireless channel to the available wireless channel. The example method also further includes combining the second access media controller with the first media access controller to provide increased throughput or signal quality on the available wireless channel. Alternatively, or in addition, the example method may include monitoring, via the first media access controller, the migrated wireless channel. Alternatively, or in addition, the example method may include detecting, via the first media access controller, a conflicting use of the migrated wireless channel. Alternatively, or in addition, the example method may include migrating, via the first media access controller, the migrated wireless channel to a third wireless channel. Alternatively, or in addition, detecting, via the first media access controller, a conflicting use of the migrated wireless channel may include detecting a radar energy profile. Alternatively, or in addition, the example method may include performing a channel availability check, via the second media access controller, on the available wireless channel for a predetermined amount of time before migrating to the available wireless channel via the first media access controller. Alternatively, or in addition, the example method may include operating, via the second media access controller, as a 1×1 single input, single output (SISO), an N×N multiple input, multiple output (MIMO), or a maximal-ratio combining (MRC) diversity connection with the first media access controller when not performing the scan. Alternatively, or in addition, the first wireless channel is a wireless local area network protocol channel and the additional wireless channels are Dynamic Frequency Selection (DFS) channels.

EXAMPLE 3

This example provides for an example one or more computer-readable memory storage devices for storing computer readable instructions that, when executed by one or more processing devices, instruct the migration of wireless channels. The computer-readable instructions may include code to receive an energy profile. The computer-readable instructions may also include code to detect an energy profile of a priority device. The computer-readable instructions may also include code to send an indication to a first media access controller on an integrated circuit chip. The first media access controller may switch to a different wireless channel upon receiving the indication. The integrated circuit chip may further include a second media access controller to concurrently scan for additional wireless channels and combine with the first media access controller when not scanning for additional wireless channels. Alternatively, or in addition the energy profile may be a radar profile. Alternatively, or in addition, the energy profile is a military device energy profile. Alternatively, or in addition, the different wireless channel is a wireless local area network protocol channel. Alternatively, or in addition, the integrated circuit chip may be a dual channel, dual concurrent integrated circuit chip.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for wireless channel migration, the system being disposed on a single integrated circuit chip, the system comprising:
    a first media access controller to initiate a first connection on a first wireless channel; and
    a second media access controller to:
        perform a scan on additional wireless channels to detect a dynamic frequency selection (DFS) wireless channel;
        detect and perform a channel availability check on the DFS wireless channel;
        send an indicator corresponding to the available DFS wireless channel to the first media access controller, the first media access controller to send the indication to a client device and migrate the first connection from the first wireless channel to the available DFS wireless channel;
        combine with the first media access controller to provide a combined communication connection on the available DFS wireless channel; and
        wherein the second media access controller is to support a radio link margin against cancellation effects using Fast Diversity selection.

2. The system of claim 1, wherein the Fast Diversity selection comprises a detection, a decoding, and an evaluation, on each of a plurality of receive chains, a single transmit signal, and a combination of a weighted signal combined from each of the plurality of receive chains, to achieve a best signal estimate in a presence of noise.

3. The system of claim 1, the first media access controller to monitor the migrated wireless channel.

4. The system of claim 3, the first media access controller to detect a conflicting use of the migrated wireless channel.

5. The system of claim 4, the first media access controller to migrate the migrated wireless channel to a third wireless channel based on the detected conflicting use.

6. The system of claim 4, the conflicting use of the migrated wireless channel comprising a radar.

7. The system of claim 6, further comprising an energy profile module to detect an energy profile of a priority device and send an indication to the first media access controller, wherein the first and the third wireless channels comprise wireless local area network protocol channels and the second wireless channel comprises a channel of a Dynamic Frequency Selection band.

8. A method for migrating between wireless channels, comprising:
    initiating, via a first media access controller on an integrated circuit chip, a first connection on a first wireless channel;
    performing, via a second media access controller on the integrated circuit chip, a scan on additional wireless channels using a second media access controller;
    detecting, via the second media access controller, an available wireless channel from the additional wireless channels;
    migrating, via the first media access controller, the first connection from the first wireless channel to the available wireless channel;
    combining the second access media controller with the first media access controller to provide increased throughput or signal quality on the available wireless channel; and
    performing, via the second media access controller, Fast Diversity selection to support a radio link margin against cancellation effects.

9. The method of claim 8, further comprising monitoring, via the first media access controller, the migrated wireless channel.

10. The method of claim 9, further comprising detecting, via the first media access controller, a conflicting use of the migrated wireless channel.

11. The method of claim 10, further comprising migrating, via the first media access controller, the migrated wireless channel to a third wireless channel.

12. The method of claim 10, wherein detecting, via the first media access controller, a conflicting use of the migrated wireless channel comprises detecting a radar energy profile.

13. The method of claim 8, further comprising performing a channel availability check, via the second media access controller, on the available wireless channel for a predetermined amount of time before migrating to the available wireless channel via the first media access controller.

14. The method of claim 13, further comprising operating, via the second media access controller, as a 1×1 single input, single output (SISO), an N×N multiple input, multiple output (MIMO), or a maximal-ratio combining (MRC) diversity connection with the first media access controller when not performing the scan.

15. The method of claim 8, wherein the first wireless channel comprises a wireless local area network protocol channel and the additional wireless channels comprise Dynamic Frequency Selection (DFS) channels.

16. One or more computer-readable memory storage devices for storing computer readable instructions that, when executed by one or more processing devices, instruct the migration of wireless channels, the computer-readable instructions comprising code to:
    receive an energy profile;
    detect an energy profile of a priority device; and
    send an indication to a first media access controller on an integrated circuit chip, the first media access controller to switch to a different wireless channel upon receiving the indication, the integrated circuit chip further comprising a second media access controller to concurrently scan for additional wireless channels and combine with the first media access controller when not scanning for additional wireless channels, wherein the second media access controller is to support a radio link margin against cancellation effects using Fast Diversity selection.

17. The one or more computer-readable memory storage devices of claim 16, wherein the energy profile comprises a radar profile.

18. The one or more computer-readable memory storage devices of claim 16, wherein the energy profile is a military device energy profile.

19. The one or more computer-readable memory storage devices of claim 16, wherein the different wireless channel is a wireless local area network protocol channel.

20. The one or more computer-readable memory storage devices of claim 16, wherein the integrated circuit chip comprises a dual channel, dual concurrent integrated circuit chip.

\* \* \* \* \*